Oct. 28, 1952        E. R. KILSBY        2,615,338
LIQUID LEVEL INDICATOR
Filed Aug. 16, 1946        2 SHEETS—SHEET 1
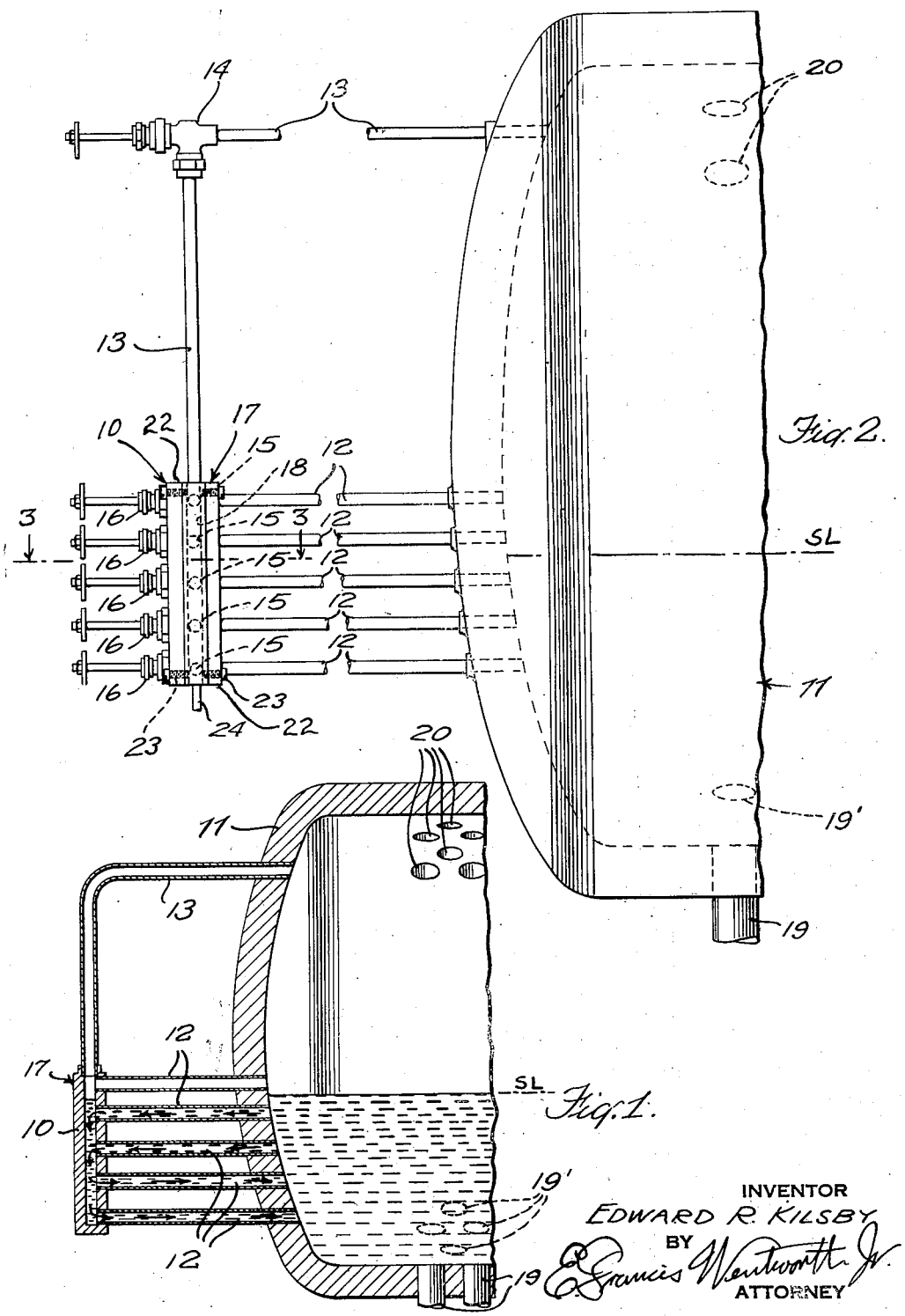
INVENTOR
EDWARD R. KILSBY
BY
Francis Wentworth Jr.
ATTORNEY Oct. 28, 1952 E. R. KILSBY 2,615,338
LIQUID LEVEL INDICATOR
Filed Aug. 16, 1946 2 SHEETS—SHEET 2
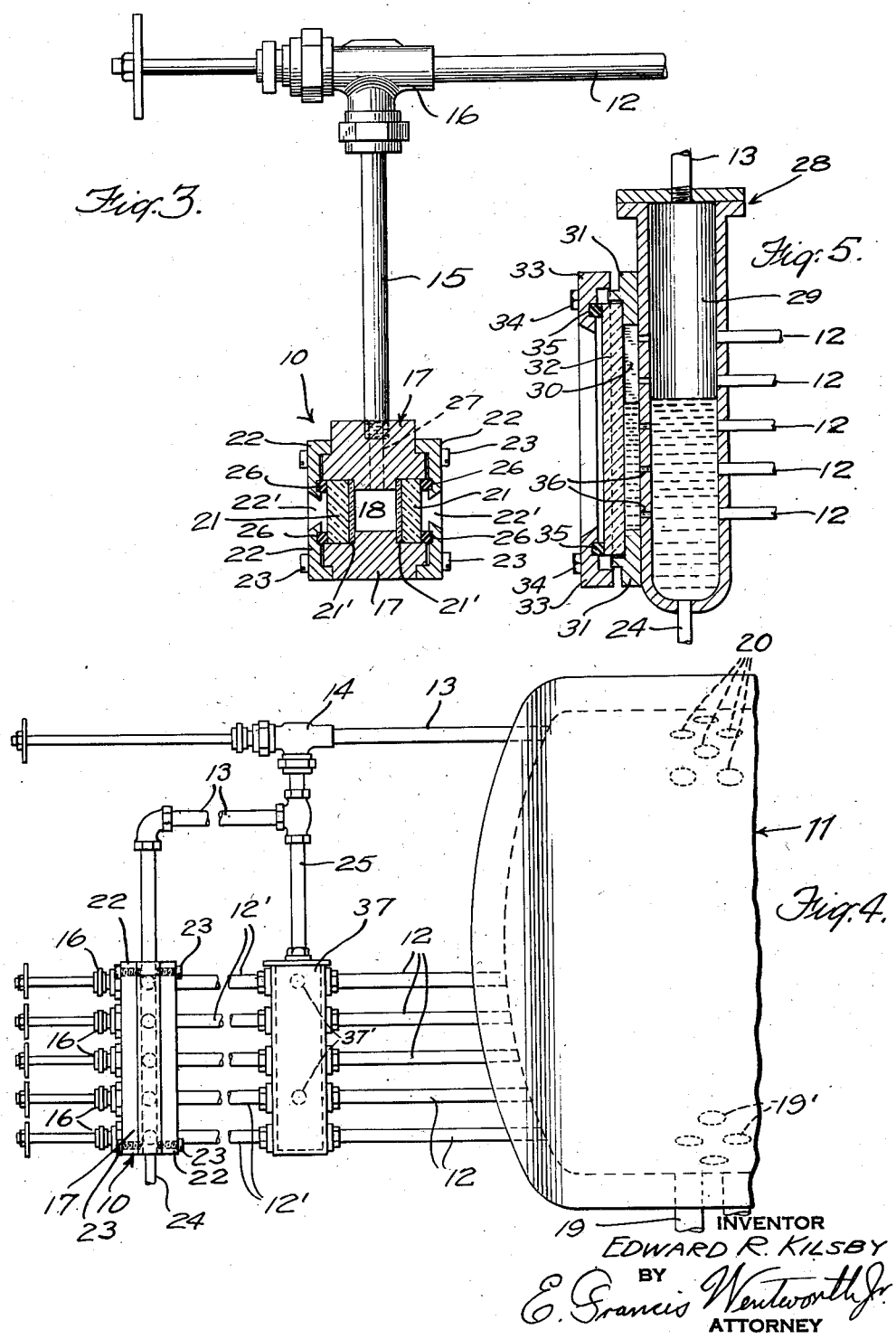
INVENTOR
EDWARD R. KILSBY
BY
E. Francis Wentworth Jr.
ATTORNEY Patented Oct. 28, 1952

2,615,338

UNITED STATES PATENT OFFICE 2,615,338

LIQUID LEVEL INDICATOR

Edward R. Kilsby, Newark, N. J., assignor to Foster Wheeler Corporation, New York, N. Y., a corporation of New York Application August 16, 1946, Serial No. 690,927

12 Claims. (Cl. 73—330)

This invention relates to liquid level indicators and more particularly to a liquid level indicator for indicating the level in a vessel containing vapor and liquid or vapor laden or emulsion-like mixtures of liquid and vapor.

An accurate visible indication of the height or surface position of a liquid or mixture of vapor and liquid in a vessel is not obtainable with the usual liquid level indicating gauge because the density of the vapor-laden liquid in the drum is different from the density of the liquid in gauge. The difference in density occurs because the liquid in the gauge, which gauge is normally located a distance from an outer wall of the vessel, is substantially vapor free and cooler than the mixture of vapor and liquid in the vessel. This is the cause of a substantial gauge error.

The present invention provides a liquid level indicator for accurately determining the liquid level in a vessel containing a vapor and liquid mixture.

The invention will be disclosed as applied to a steam and water drum of a steam generator to indicate the water level in said drum but it will be understood that the invention is capable of accurately indicating the liquid level in vessels containing a mixture of vapor and liquids generally.

This invention will be understood from the following description when considered in connection with the accompanying drawings in which:

Fig. 1 is a more or less diagrammatic vertical sectional view of the present invention applied to the steam and water drum of a steam generator;

Fig. 2 is an elevational view of the invention associated with the steam and water drum of a steam generator;

Fig. 3 is a horizontal sectional view taken on the line 3—3 of Fig. 2;

Fig. 4 is a view similar to Fig 2 but of another embodiment of the invention, and Fig. 5 is a vertical sectional view of a further embodiment of the invention.

Like characters of reference refer to the same or similar parts throughout the several views.

Referring to the drawings, the gauge of the present invention is designated generally by the reference numeral 10 and is positioned in spaced relationship with the end of a steam and water drum 11. The gauge, as shown, is in communication with the steam and water drum 11 of a steam generator above and below the surface level SL by a plurality of closely spaced substantially horizontally extending tubes 12. Each of the tubes 12, as shown, communicates with the gauge body 17 through a valve controlled L-connection 16 and horizontally extending tube 15 (Fig. 3). The steam and water drum 11 has a plurality of riser tubes 19' and downcomer tubes 19 through which fluid circulates and also has one or more steam outlet tubes 20.

The gauge 10 comprises a body 17 extending in a substantially vertical plane which body member has vertical water passage 18 extending longitudinally therein. Tubes 15 are connected to the body member 17 and are in communication with the passage 18 through inlet ports 27 in the body member 17. Elongated pieces of gauge glass 21 are secured along opposite sides of the body member 17 adjacent passage 18 by securing members 22 having vision slots 22' therein, the members 22 being held in position by bolts 23. Each of the glass strips 21 has a piece of mica 21' at the side thereof adjacent the passage 18. Suitable gaskets 26 are interposed between members 22 and glass 21 so that the glass, the members 22 and the member 17 are held in fluid-tight relationship by bolts 23. The passage 18 in body member 17 is in communication at the top thereof through conduit 13 controlled by a valve 14 with the steam space in the upper part of drum 11. A drain 24 is connected to the bottom of passage 18.

In operation, water is admitted into the drum 11 through a feed water line, not shown, until a proper water level in the drum is obtained. The feed water from the drum is fed to the tubes of the vapor generator, not shown, through downcomers 19 and steam generated rises intermixed with liquid through riser tubes 19'. Steam thereafter is contained in the upper part of the drum above the surface level SL, while below said surface level there is a body of steam laden water. The steam laden water flows into the passage 18 in the gauge body 17 through upper tubes 12, 15 (see Fig. 1) and inlet ports 27, to thereby indicate through gauge glass 21 in gauge 10 the level of steam laden water in the drum. Since the gauge 10 is normally spaced a substantial distance from the end of the drum 11, some heat is given up by the steam laden water in flowing through the tubes 12 and 15 so that the water in the passage 18 of the gauge is substantially steam-free but, at the level of the uppermost tubes 12, it is at substantially the same temperature as the mixture in the drum. The water flowing between drum 11 and passage 18 of the gauge 10 passes through inlet ports 27 at a plurality of closely spaced levels. As the water in passage 18 continues to cool, its density increases causing it to flow back through the lower of tubes 15, 12, into steam and water drum 11 wherein the heights of the mixture above the lower tubes 12 does not provide a hydraulic or hydrostatic pressure equal to that provided by the more dense fluid in passage 18. Flow from passage 18 to steam and water drum 11 through lower tubes 12 tends to lower the height of the column of fluid in passage 18, causing fluid to flow through the upper of tubes 12, 15 from the steam and water drum into passage 18. Thus the passage 18 may be considered as containing fluid of least density at the top thereof, with such uppermost fluid continually replenished through circulation. An accurate visible indication in the gauge, through the gauge glass strips 21, of the level of the steam laden water in the drum will, therefore, be obtained.

For example, in a vapor generator designed to generate steam at 650 pounds per square inch at 500° F. in which the diameter of the steam and water drum is approximately sixty inches the tubes 12 and 15 comprise one-half inch pipe and are spaced three inches apart in a vertical plane. In such construction, the gauge of the present invention would not indicate the water level in the drum erroneously, regardless of the density of the steam laden water in the drum, by more than approximately one inch to one and one-half inches. The above example is given merely to illustrate the operation of the present invention and is not to have a limiting effect thereon. It will be understood that the dimensions given are given merely by way of illustration and are not to have a limiting effect on the scope of the invention.

Referring to Fig. 4 of the drawings in the embodiment of the invention disclosed therein, the gauge 10 has a residue collecting chamber or container 37 positioned in spaced relationship to the end of the drum and intermediate said gauge and the adjacent end of the drum 11. As shown, the chamber 37 has connections or fluid outlets 37' to which a gauge glass structure, not shown, may be attached if desired. Tubes 12, which are arranged in substantially the same manner as in the embodiment of the invention disclosed in Figs. 1 to 3, are in communication with the container 37 while pipes 12' are each connected at one end to said container and at the opposite end to valve controlled L-connection 16. As in the form of the invention shown in Figs. 1 to 3, tubes 15 communicate at the opposite ends thereof with the L-connection 16 and the body member 17 of gauge 10. Container 37 is in communication with the line 13 through conduit 25.

In operation of the embodiment of the invention shown in Fig. 4, steam laden water flows from the drum 11 through the tubes 12 thence into the container 37. Residue in the steam laden water settles in the residue collecting container or chamber 37 and water from which residue has settled thereafter passes through pipes 12', L-connections 16, tubes 15 and into passage 18 in the gauge 10. The operation otherwise is substantially the same as the operation of the embodiment of the invention disclosed in Figs. 1 to 3.

Referring to Fig. 5 of the drawings, the embodiment of the invention disclosed therein comprises a liquid level indicating gauge having a container 28 with a fluid space 29 therein. A passage 30 is formed along one side and outside the space 29 of the container 28 by a body member 31 attached to the outer wall of the container in a fluid-tight manner, the outer wall of the container forming one side of the passage while the opposite side thereof is formed by a strip of glass 32. The glass is held in position in a fluid-tight manner by a clamping member 33 secured to the body member 31 by bolts 34. A gasket 35 is interposed between the clamping member 33 and the glass 32. Like passage 18 of the gauge 10 shown in Fig. 2, fluid space 29 of the container 28 is in communication with a drum 11 through the spaced tubes 12 which are arranged in substantially the same manner as the tubes 12 in Fig. 1. Fluid space 29 is in communication with the passage 30 through a plurality of ports 36 through the side wall of container 28 and are disposed in spaced relationship to one another and in substantial horizontal alignment with an adjacent tube 12 in the other side wall of said container.

The operation of the embodiment of the invention shown in Fig. 5 is similar to the operation of the embodiment shown in Fig. 2 except that the liquid from drum 11 flows into the fluid space 29 of the container 28 whence it passes through ports 36 into passage 30. The liquid level in the passage 30 is visible through the glass strip 32. The operation of this embodiment of the invention is otherwise substantially the same as the operation of the embodiment shown in Figs. 1 to 3.

Inasmuch as various changes may be made in the form, location and arrangement of the operation of the apparatus disclosed without departing from the principles of the invention, it will be understood that the invention is not to be limited excepting by the scope of the appended claims.

What is claimed is:

1. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, a plurality of conduits, one of said conduits being in communication with the drum adjacent the uppermost point at which the vapor-laden liquid in the drum is to be visibly indicated, another of said conduits being in communication with the drum adjacent the lowermost point at which the vapor-laden liquid is to be visibly indicated and intermediate conduits in communication with the drum at vertically spaced points intermediate said uppermost and lowermost points, each conduit being in communication with said passage at a point in substantially the same horizontal plane as its point of communication with the drum, indicating means communicating with said passage and adapted to visibly indicate the level of vapor-laden liquid therein at any level between said uppermost and lowermost levels, and a pressure equalizing connection between the vapor space of the drum and the upper part of the indicator passage.

2. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, a plurality of conduits, one of said conduits being in communication with the drum above said normal vapor-laden liquid level and adjacent the uppermost point at which the vapor-laden liquid in the drum is to be visibly indicated, another of said conduits being in communication with the drum below said normal vapor-laden liquid level and adjacent the lowermost point at which the vapor-laden liquid is to be visibly indicated and intermediate conduits in communication with the drum at vertically spaced points intermediate said uppermost and lowermost points, each conduit being in communication with said passage at a point in substantially the same horizontal plane as its point of communication with the drum, level indicating means communicating with said passage and adapted to visibly indicate the level of vapor-laden liquid therein at any level between said uppermost and lowermost levels, and a pressure equalizing connection between the vapor space of the drum and the indicator passage above said uppermost point.

3. An indicator for indicating the level of vapor-laden liquid in a vapor and liquid drum of a vapor generator, which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, a plurality of conduits extending in vertically spaced horizontal planes, one of said conduits being in communication at one end thereof with the drum adjacent the uppermost point at which the vapor-laden liquid in the drum is to be visibly indicated, another of said conduits being in communication at one end thereof with the drum adjacent the lowermost point at which the vapor-laden liquid is to be visibly indicated and intermediate conduits in communication at one end thereof with the drum at vertically spaced points intermediate said uppermost and lowermost points, each conduit being in communication at the opposite end thereof with said passage at a point in substantially the same horizontal plane as its point of communication with the drum, level indicating means communicating with said passage and adapted to visibly indicate the level of vapor-laden liquid therein at any level between said uppermost and lowermost levels, and a pressure equalizing connection between the vapor space of the drum and the upper part of the indicator passage.

4. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, a plurality of conduits, one of said conduits being in communication with the drum adjacent the uppermost point at which the vapor-laden liquid in the drum is to be visibly indicated, another of said conduits being in communication with the drum adjacent the lowermost point at which the vapor-laden liquid is to be visibly indicated and intermediate conduits in communication with the drum at vertically spaced points intermediate said uppermost and lowermost points, each conduit being in communication with said passage at a point in substantially the same horizontal plane as its point of communication with the drum, a gauge glass communicating with said passage and extending at least between a level corresponding to the level of the point of communication of the conduit adjacent said uppermost level with said passage and a level corresponding to the level of the point of communication of the conduit adjacent said lowermost level with said passage, and a pressure equalizing connection between the vapor space of the drum and the upper part of the indicator passage.

5. An indicator for indicating the level of vapor-laden liquid in a vapor and liquid drum of a vapor generator, which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, a plurality of conduits extending in vertically spaced horizontal planes, one of said conduits being in communication at one end thereof with the drum adjacent the uppermost point at which the vapor-laden liquid in the drum is to be visibly indicated, another of said conduits being in communication at one end thereof with the drum adjacent the lowermost point at which the vapor-laden liquid is to be visibly indicated and intermediate conduits in communication at one end thereof with the drum at vertically spaced points intermediate said uppermost and lowermost points, each conduit being in communication at the opposite end thereof with said passage at a point in substantially the same horizontal plane as its point of communication with the drum, a gauge glass communicating with said passage and extending at least between a level corresponding to the level of the point of communication of the conduit adjacent said uppermost level with said passage and a level corresponding to the level of the point of communication of the conduit adjacent said lowermost level with said passage, and a pressure equalizing connection between the vapor space of the drum and the upper part of the indicator passage.

6. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, means forming a fluid-tight chamber, said chamber being positioned in the space between said indicator and the drum, a plurality of conduits, one of said conduits being in communication with the drum adjacent the uppermost point at which the vapor-laden liquid in the drum is to be visibly indicated, another of said conduits being in communication with the drum adjacent the lowermost point at which the vapor-laden liquid is to be visibly indicated and intermediate conduits in communication with the drum at vertically spaced points intermediate said uppermost and lowermost points, each conduit being in communication with said chamber at a point in substantially the same horizontal plane as its point of communication with the drum, a plurality of further conduits in communication with said chamber at one end thereof and with said passage at the opposite end thereof, the points of communication of said other conduits with the chamber and with the passage being in substantially the same horizontal planes respectively as the points of communication of said one conduit, said other conduit and said intermediate conduits with the chamber and with said drum, level indicating means communicating with said passage and adapted to visibly indicate the level of vapor-laden liquid therein at any level between said uppermost and lowermost levels, and a pressure equalizing connection between the vapor space of the drum and the upper part of the indicator passage.

7. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, means forming a fluid-tight chamber, said chamber being positioned in the space between said indicator and the drum, a plurality of conduits, one of said conduits being in communication with the drum adjacent the uppermost point at which the vapor-laden liquid in the drum is to be visibly indicated, another of said conduits being in communication with the drum adjacent the lowermost point at which the vapor-laden liquid is to be visibly indicated and intermediate conduits in communication with the drum at vertically spaced points intermediate said uppermost and lowermost points, each conduit being in communication with said chamber at a point in substantially the same horizontal plane as its point of communication with the drum, a plurality of further conduits in communication with said chamber at one end thereof and with said passage at the opposite end thereof, the points of communication of said other conduits with the chamber and with the passage being in substantially the same horizontal planes respectively as the points of communication of said one conduit, said other conduit and said intermediate conduits with the chamber and with said drum, a gauge glass communicating with said passage and extending at least between a level corresponding to the level of the point of communication of the conduit adjacent said uppermost level with said passage and a level corresponding to the level of the point of communication of the conduit adjacent said lowermost level with said passage, and a pressure equalizing connection between the vapor space of the drum and the upper part of the indicator passage.

8. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, means forming a fluid space outside of said passage and extending longitudinally thereof, there being partition means between the passage and the fluid space, the fluid space being in communication with the passage at different levels through a plurality of openings in the partition, a plurality of conduits, one of said conduits being in communication with the drum adjacent the uppermost point at which the vapor-laden liquid in the drum is to be visibly indicated, another of said conduits being in communication with the drum adjacent the lowermost point at which the vapor-laden liquid is to be visibly indicated and intermediate conduits in communication with the drum at vertically spaced points intermediate said uppermost and lowermost points, each conduit being in communication with said means forming a fluid space at a point in substantially the same horizontal plane as its point of communication with the drum, level indicating means communicating with said passage and adapted to visibly indicate the level of vapor-laden liquid therein at any level between said uppermost and lowermost levels, and a pressure equalizing connection between the vapor space of the drum and the upper part of said indicator passage above said uppermost point.

9. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, means forming a fluid space outside of said passage and extending longitudinally thereof, there being partition means between the passage and the fluid space, a plurality of conduits, one of said conduits being in communication with the drum adjacent the uppermost point at which the vapor-laden liquid in the drum is to be visibly indicated, another of said conduits being in communication with the drum adjacent the lowermost point at which the vapor-laden liquid is to be visibly indicated and intermediate conduits in communication with the drum at vertically spaced points intermediate said uppermost and lowermost points, each conduit being in communication with said means forming a fluid space at a point in substantially the same horizontal plane as its point of communication with the drum, said fluid space being in communication with said passage through a plurality of vertically spaced openings in said partition means, each of the openings being in a horizontal plane corresponding to the horizontal plane of a point of communication of said conduits with the means forming a fluid space, indicating means communicating with said passage and adapted to visibly indicate the level of vapor-laden liquid therein at any level between said uppermost and lowermost levels, and a pressure equalizing connection between the vapor space of the drum and the upper part of said indicator passage above said uppermost point.

10. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, means forming a fluid space outside of said passage and extending longitudinally thereof, there being partition means between the passage and the fluid space, a plurality of conduits, one of said conduits being in communication with the drum adjacent the uppermost point at which the vapor-laden liquid in the drum is to be visibly indicated, another of said conduits being in communication with the drum adjacent the lowermost point at which the vapor-laden liquid is to be visibly indicated, and intermediate conduits in communication with the drum at vertically spaced points intermediate said uppermost and lowermost points, each conduit being in communication with said means forming a fluid space at a point in substantially the same horizontal plane as its point of communication with the drum, said fluid space being in communication with said passage through a plurality of vertically spaced openings in said partition means, each of the openings being in a horizontal plane corresponding to the horizontal plane of a point of communication of said conduits with the means forming a fluid space, a gauge glass communicating with said passage and extending at least between a level corresponding to the level of the uppermost opening in said partition and a level corresponding to the level of the lowermost opening in said partition, and a pressure equalizing connection between the vapor space of the drum and the upper part of the indicator passage.

11. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, means forming a fluid-tight chamber, said chamber being positioned in the space between said indicator and the drum and at substantially the same level as the indicator, a plurality of conduits, at least one of said conduits being in communication with the vapor space of the drum and with said chamber, at least a second of said conduits being in communication with the drum adjacent the uppermost point at which the vapor-laden liquid in the drum is to be visibly indicated, at least another conduit being in communication with the drum adjacent the lowermost point at which the vapor-laden liquid is to be visibly indicated, and conduits intermediate said second and said other conduits in communication with the drum at vertically spaced points intermediate said uppermost and lowermost points, each of the second, intermediate and other conduits being in communication with said chamber at a point in substantially the same horizontal plane as its point of communication with the drum, a plurality of further conduits in communication with said chamber at one end thereof and with said passage at the opposite end thereof, one of said further conduits extending in substantially the same horizontal plane as the uppermost point at which the vapor-laden liquid in the drum is to be visibly indicated, another of said further conduits extending in substantially the same horizontal plane as the lowermost point at which the vapor-laden liquid in the drum is to be visibly indicated, and intermediate further conduits extending in horizontal planes intermediate the horizontal planes of said one and another further conduits, and level indicating means communicating with said passage and adapted to visibly indicate the level of vapor-laden liquid therein at any level between said uppermost and lowermost levels.

12. An indicator for indicating the level of vapor-laden liquid in a vapor and liquid drum of a vapor generator which drum has a vapor space above a normal vapor-laden liquid level in the drum and a vapor-laden liquid space below said level, said indicator being positioned outside the drum in spaced relationship thereto, the indicator comprising a gauge body having a substantially vertical passage, means forming a fluid-tight chamber, said chamber being positioned in the space between said indicator and the drum and at substantially the same level as the indicator, a plurality of conduits, at least one of said conduits being in communication with the vapor space of the drum and with said chamber, at least a second of said conduits being in communication with the drum adjacent the uppermost point at which the vapor-laden liquid in the drum is to be visibly indicated, at least another conduit being in communication with the drum adjacent the lowermost point at which the vapor-laden liquid is to be visibly indicated, and conduits intermediate said second and said other conduits in communication with the drum at vertically spaced points intermediate said uppermost and lowermost points, each of the second, intermediate and other conduits being in communication with said chamber at a point in substantially the same horizontal plane as its point of communication with the drum, a plurality of further conduits in communication with said chamber at one end thereof and with said passage at the opposite end thereof, one of said further conduits extending in substantially the same horizontal plane as the uppermost point at which the vapor-laden liquid in the drum is to be visibly indicated, another of said further conduits extending in substantially the same horizontal plane as the lowermost point at which the vapor-laden liquid in the drum is to be visibly indicated, and intermediate further conduits extending in horizontal planes intermediate the horizontal planes of said one and another further conduits, level indicating means communicating with said passage and adapted to visibly indicate the level of vapor-laden liquid therein at any level between said uppermost and lowermost levels, and a drain connection in communication with the lower part of said passage.

EDWARD R. KILSBY.

REFERENCES CITED

The following references are of record in the file of this patent:

UNITED STATES PATENTS

| Number | Name | Date |
|---|---|---|
| 57,118 | Githens | Aug. 14, 1866 |
| 226,418 | Purves | Apr. 13, 1880 |
| 353,920 | Cheek | Dec. 7, 1886 |
| 1,669,110 | Wencel | May 8, 1928 |
| 1,962,187 | Flock | June 12, 1934 |
| 2,016,481 | Brelsford | Oct. 8, 1935 |
| 2,031,644 | Gunderson | Feb. 25, 1936 |